(12) United States Patent
Ninnemann et al.

(10) Patent No.: US 12,115,592 B2
(45) Date of Patent: Oct. 15, 2024

(54) METHOD FOR MANUFACTURING A WELDABLE METAL-POLYMER MULTILAYER COMPOSITE

(71) Applicant: Outokumpu Oyj, Helsinki (FI)

(72) Inventors: Philip Ninnemann, Uedem (DE); Thomas Hündgen, Juechen (DE); Thomas Fröhlich, Ratingen (DE); Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 691 days.

(21) Appl. No.: 16/472,343

(22) PCT Filed: Dec. 14, 2017

(86) PCT No.: PCT/EP2017/082855
§ 371 (c)(1),
(2) Date: Jun. 21, 2019

(87) PCT Pub. No.: WO2018/114606
PCT Pub. Date: Jun. 28, 2018

(65) Prior Publication Data
US 2019/0358731 A1     Nov. 28, 2019

(30) Foreign Application Priority Data
Dec. 22, 2016   (EP) .................................. 16206337

(51) Int. Cl.
*B23K 11/06* (2006.01)
*B23K 11/00* (2006.01)
(Continued)

(52) U.S. Cl.
CPC ............ *B23K 11/06* (2013.01); *B23K 11/002* (2013.01); *B23K 11/11* (2013.01); *B23K 11/16* (2013.01);
(Continued)

(58) Field of Classification Search
CPC ..... B23K 11/002; B23K 11/06; B23K 11/061; B23K 11/087; B23K 11/16; B23K 11/11;
(Continued)

(56) References Cited

U.S. PATENT DOCUMENTS

| 4,650,951 A  * | 3/1987 | Koga ................... B23K 11/163 219/118 |
| 6,517,952 B1 | 2/2003 | Gustafsson |

(Continued)

FOREIGN PATENT DOCUMENTS

| DE | 102011109708 A1 | 2/2013 |
| DE | 102011054362 A1 | 4/2013 |

(Continued)

OTHER PUBLICATIONS

Coretinium: A unique and durable composite solution that delivers weight savings to the transport sector, Tata Steel, , Jan. 2015, retrieved from www.tatasteeleurope.com.

*Primary Examiner* — Dana Ross
*Assistant Examiner* — Joseph W Iskra
(74) *Attorney, Agent, or Firm* — The Webb Law Firm

(57) ABSTRACT

A method for manufacturing a sandwich panel as a semi-finished product where at least one layer of a non-metallic material is positioned between at least two metallic layers. At least one of the metal layers is shaped into a three dimensional layer and the metal layers are material closured to each other by a tack weld on the metallic contacts between the metallic layers to enable resistance weldability of the semi-finished product in order to connect the semi-finished product to a desired combination of solutions.

19 Claims, 1 Drawing Sheet

(51) Int. Cl.

| | | |
|---|---|---|
| *B23K 11/11* | (2006.01) | |
| *B23K 11/16* | (2006.01) | |
| *B23K 103/04* | (2006.01) | |
| *B23K 103/08* | (2006.01) | |
| *B23K 103/10* | (2006.01) | |
| *B23K 103/16* | (2006.01) | |
| *B23K 103/18* | (2006.01) | |
| *B32B 7/05* | (2019.01) | |
| *B32B 7/12* | (2006.01) | |
| *B32B 15/092* | (2006.01) | |
| *B32B 15/18* | (2006.01) | |
| *B32B 15/20* | (2006.01) | |
| *B32B 37/06* | (2006.01) | |

(52) U.S. Cl.
CPC ............... *B32B 7/05* (2019.01); *B32B 7/12* (2013.01); *B32B 15/092* (2013.01); *B32B 15/18* (2013.01); *B32B 15/20* (2013.01); *B32B 37/065* (2013.01); *B23K 2103/04* (2018.08); *B23K 2103/05* (2018.08); *B23K 2103/10* (2018.08); *B23K 2103/15* (2018.08); *B23K 2103/172* (2018.08); *B23K 2103/18* (2018.08); *B32B 2307/202* (2013.01)

(58) Field of Classification Search
CPC ......... B23K 2103/04; B23K 2103/05; B23K 2103/10; B23K 2103/15; B23K 2103/172; B23K 2103/18; B32B 15/043; B32B 15/08; B32B 15/092; B32B 15/18; B32B 15/20; B32B 2250/04; B32B 2250/40; B32B 2307/202; B32B 2419/00; B32B 2605/00; B32B 2605/08; B32B 2605/10; B32B 27/38; B32B 3/28; B32B 37/065; B32B 7/05; B32B 7/12
USPC ....................................................... 228/173.1
See application file for complete search history.

(56) References Cited

U.S. PATENT DOCUMENTS

| | | | | |
|---|---|---|---|---|
| 6,610,445 | B1 * | 8/2003 | Moriwaki | H01M 4/30 429/218.2 |
| 7,476,825 | B2 * | 1/2009 | Hirth | B23K 11/06 219/83 |
| 8,476,549 | B2 * | 7/2013 | Nakagawa | B23K 11/20 219/78.01 |
| 8,502,105 | B2 * | 8/2013 | Tanaka | C09J 5/10 219/86.22 |
| 10,179,371 | B2 * | 1/2019 | Chergui | B23K 11/0026 |
| 10,583,516 | B2 * | 3/2020 | Chergui | B23K 11/16 |
| 10,786,872 | B2 * | 9/2020 | Kawakita | B23K 26/082 |
| 10,933,488 | B2 * | 3/2021 | Furusako | B23K 11/257 |
| 11,027,361 | B2 * | 6/2021 | Wakabayashi | B23K 11/16 |
| 2003/0152764 | A1 * | 8/2003 | Bunyan | H01L 23/4275 428/328 |
| 2005/0230033 | A1 | 10/2005 | Faehrrolfes et al. | |
| 2007/0103046 | A1 * | 5/2007 | Tinwell | H01T 21/02 313/143 |
| 2008/0237203 | A1 * | 10/2008 | Tanaka | C09J 5/06 219/121.64 |
| 2008/0263853 | A1 * | 10/2008 | Tsai | C09J 5/06 29/592 |
| 2010/0040902 | A1 * | 2/2010 | Mizrahi | B32B 27/36 524/424 |
| 2011/0188927 | A1 | 8/2011 | Mizrahi | |
| 2013/0189539 | A1 | 7/2013 | Van De Langkruis et al. | |
| 2013/0273387 | A1 | 10/2013 | Kleier et al. | |
| 2014/0120364 | A1 * | 5/2014 | Peca | B32B 7/04 428/614 |
| 2014/0224774 | A1 | 8/2014 | Chergui et al. | |
| 2014/0298875 | A1 | 10/2014 | Chergui | |
| 2015/0126676 | A1 | 5/2015 | Backer et al. | |
| 2015/0165724 | A1 | 6/2015 | Cox et al. | |
| 2015/0202844 | A1 | 7/2015 | Boger et al. | |
| 2015/0336143 | A1 | 11/2015 | Krautschick et al. | |
| 2015/0336356 | A1 | 11/2015 | Pogadetz-Kiehl et al. | |
| 2016/0186285 | A1 * | 6/2016 | Kim | C22C 38/00 148/603 |
| 2017/0348789 | A1 | 12/2017 | Frohlich et al. | |
| 2018/0056432 | A1 | 3/2018 | Lindner et al. | |
| 2018/0326525 | A1 * | 11/2018 | Ann | B41F 19/005 |

FOREIGN PATENT DOCUMENTS

| | | |
|---|---|---|
| EP | 0333685 A2 | 9/1989 |
| EP | 1059160 A2 | 12/2000 |
| EP | 3153315 A1 | 4/2017 |
| FR | 2709083 A1 | 2/1995 |
| JP | 0127125 B2 | 5/1989 |
| JP | 0278541 A | 3/1990 |
| JP | 2006305591 A | 11/2006 |
| WO | 9801295 A1 | 1/1998 |
| WO | 03082573 A1 | 10/2003 |
| WO | 2004002646 A1 | 1/2004 |
| WO | 2008125228 A1 | 10/2008 |
| WO | 2011082128 A1 | 7/2011 |
| WO | 2012048844 A1 | 4/2012 |
| WO | 2012150144 A1 | 11/2012 |
| WO | 2013020636 A1 | 2/2013 |
| WO | 2014001152 A1 | 1/2014 |
| WO | 2014009114 A1 | 1/2014 |
| WO | WO-2014096180 A1 * | 6/2014 ............ B21B 1/227 |
| WO | 2014121940 A1 | 8/2014 |
| WO | 2016097186 A1 | 6/2016 |
| WO | 2016146511 A1 | 9/2016 |

* cited by examiner

METHOD FOR MANUFACTURING A WELDABLE METAL-POLYMER MULTILAYER COMPOSITE

CROSS-REFERENCE TO RELATED APPLICATIONS

This application is the United States national phase of International Application No. PCT/EP2017/082855 filed Dec. 14, 2017, and claims priority to European Patent Application No. 16206337.4 filed Dec. 22, 2016, the disclosures of which are hereby incorporated by reference in their entirety.

BACKGROUND OF THE INVENTION

Field of the Invention

The present invention relates to a method for manufacturing a weldable metal-polymer multilayer composite as a semi-finished product where a resistance heating process is used to have a substance to substance bond between the different metal layers and to have therefore at the end a continuous material resistance for the whole composite. Then during a subsequent component manufacturing step the composite is dissimilar weldable to other metal components, sheets or composites. The subsequent processing industry can then directly use the semi-finished multilayer composite for further resistance welding processes.

Description of Related Art

Composite structures can be fabricated from a wide variety of metallic, polymeric, ceramic or organic materials in different structures and combinations. Stamm K., Witte H., Sandwichkonstruktionen. Springer-Verlag, Wien, New York, 1974 shows different design variations for such composite constructions. According to the literature, composite structures can be differentiated between infiltrated composites, corpuscles compounds, fiber composites or multilayer composites. Layer composites are macroscopically inhomogeneous. One kind of a layer composite is sandwich constructions defined as structures having several layers with respectively specific material properties. One further characteristic is that the different layers are flat ordered and parallel orientated to each other. A typical upset of a sandwich structure is two metallic outer-layers bonded to a polymer core material from two sides. The core layers can be further differentiated with regard to their supporting effect:

Core materials having a support effect
homogeneous
selective
partial and local
unidirectional
multi-directional Advantages of using sandwich designs are a high lightweight potential with at the same time a high stiffness and strength level. The design of a sandwich can be component-dependent adjusted to the level and directions of the component loads. Additionally significant higher mechanical as well as acoustic energy absorption can be realised in comparison to monolithic materials. Aerospace as well as automotive engineering, engineering of commercial vehicles, motorcycles, agricultural as well as railway vehicles, ship and building constructions, containers or the industry of renewables energies are only some processing industries using the mentioned advantages of sandwich structures.

On the other side sandwich structures often needs complex manufacturing processes. Further well-established and cost-efficient production methods for monolithic materials like steel are not possible to use. This applies especially for welding processes like the resistance welding.

For the resistance welding with its sub-processes spot welding, roller seam welding or projection welding, the physical law of Joule for resistance heating is used. That means the transformation of electrical energy into ohmic resistance and then further into thermal energy. In a spot welding process then a current flows in an electric circuit. The machine parts are made of copper to have a good current transmission with low resistance and a low heat loss. At the transition points from the copper to the metallic sheets, between the sheets and from the second sheet to the copper, the current energy is changed to ohmic resistances. These resistances are called transition resistances or contact resistances. Within a homogeneous and monolithic material the resistance is called material resistance and is much lower than the transition resistance what results in a significant lower heat. Because of the effect, that the transition resistance between the two sheets is by far the highest, the thermal energy is at this point the highest, too. At the end the thermal energy at this point reaches the melting temperature of the sheets and a weld point or called weld nugget results. For a multilayer sheet combination with more than two sheets, the effect can be reached at different transition points of the materials, depending on the physical properties of the used metallic materials. Thereby the effect can be occurring wanted (like a three sheet combination in automotive car body engineering) or unwanted, e.g. when a metallic contact is undesired created for origin isolated electric engineering components.

The formula for the thermal energy is:

$$Q = I_s^2 * t * R_G \qquad (1)$$

with $I_s$ as the welding current, t=welding time and $R_G$=sum of all before mentioned resistances. Further on $R_G$ can be expressed as:

$$R_G = R_M + R_T \qquad (2)$$

wherein $R_M$ is the sum of all material resistances and $R_T$ is the sum of all transition resistances. Further detailed $R_M$ can be defined by the formula:

$$R_M = (\rho_{EL} * L)/A \qquad (3)$$

wherein $\rho_{EL}$ is the specific electrical resistance of the material, L is the conductor length and A as the conductor cross section.

If the metal is produced with a surface finish like a galvanizing layer, $R_T$ can be further specified into:

$$R_T = R_C + R_B + R_I \qquad (4)$$

wherein $R_C$ is the constriction resistance, $R_B$ is the bulk resistance and $R_I$ is the impurity layer defined by $$R_I = (\rho_H * 2 * s)/(\pi * r^2) \qquad (5)$$

wherein $\rho_H$ is the specific main resistance, s as the impurity layer thickness, $\pi$ as the number Pi and r as the maximum contact radius.

One disadvantage when working with state-of-the-art sandwich structures is the non-weldability by resistance welding processes when the sandwich structure should be welded together with other components or sheets in the processing industry. In the state-of-the-art there is at least one isolating non-metallic material layer in the sandwich structure, e.g. the polymer or bonding material. Because of this, the electric circuit is not closed during resistance welding and therefore no thermal energy, which melts the sandwich structure to the other component or sheet, can be created.

Typical sandwich panels with a flat order of the different layers are mentioned in the WO publications 2014009114A1, 2014001152A9, 2012048844A1, and 2013156167A1 as well as in the Tata steel data sheet "Coretinium®—A unique and durable composite solution that delivers light-weight products and design innovation" (Internet address: http://www.tatasteel europe.com/static_files/Downloads/Construction/Coretinium/Coretinium%20gen%/20app%20data%20sheet.pdf).

Further, the WO publications 2008125228A1 and 2004002646A1 describe a method for manufacturing a metallic sandwich structure wherein the different layers are bonded together. All these WO publications have the same disadvantage of having an isolating material between the metallic outer-layers which results in a non-resistance-weldability.

The JP publication H01-127125 describes a method for manufacturing a sandwich panel containing two sheet metal layers and one corrugated element. Spot welding is used to fit the first sheet metal layer to one surface of a corrugated strip. Then a bonding tape process follows. A pair of press roller machines is used to fit the second sheet metal layer to the second surface of the corrugated strip by pressurizing and bonding. The disadvantage of the resulting semi-finished product is the fact that the subsequent processing industry like car body manufacturer cannot use these kinds of sandwich products for further resistance welding processes to join this sandwich panel with other car body sheets, plates or formed components together. The reason is that the mentioned bonding tape works as an isolator for the electric circuit in a resistance welding process. No weld nugget and therefore no connection can be created.

The JP patent publication H02-78541A describes a method how to produce a sandwich structure wherein recessed parts are produced on the outside surface of one metal sheet in a laminate formed by interposing resin. It is worked out that the distance between the tip of the projected part and the inside surface of the other metal sheet are specified with the distance. That means, in spite of using a profiled outer-layer steel sheet, there will be at the end a defined isolating gap between both metal sheets which results in a non-resistance weldable configuration.

The EP patent publication 1059160A2 describes a composite material wherein the core layer is firmly attached with two outer-layers. But the layer materials are characterized as non-metallic (textile patterns) and the contact is not material closured. Notwithstanding that this EP publication is the first quoted one, which describes a continuous contact over the whole composite thickness, and resistance weldability is therefore non-existent.

Further the WO patent publication 03082573A1 and the US patent publication 2005126676A1 describe devices and methods for the production of composite materials. In addition to the metallic outer-layers, the core layer contains also metallic elements in kind of short-cut fibers. But a continuous material closure over the complete height of the sandwich structure is not possible because on both outer-layers an adhesive is applied during the first manufacturing steps. Related design variations are also known from EP patent publication 1059160A2, where non-weldable spacer textiles are used for the core material, or WO patent publication 9801295A1 and EP patent publication 0333685A2, where fibers as a core material are applied by electrostatic precipitation or rather electrostatic deposition.

The WO patent publication 2016097186A1 describes a way how to manufacture a sandwich panel as a semi-finished product where at least one three dimensional metallic layer is used to achieve a directly mechanical contact between all metallic layers and therefore to enable a current flow during resistance welding because of the therefore closed electric circuit. One disadvantage of this publication for joining this sandwich panel to other metallic sheets or components is that there is not a material closure of all metallic layers, only a directly mechanical contact which works during spot welding as a further transition resistance additionally to the original transition resistance between the sandwich panel and another metallic sheet or component. Therefore it is possible that the weld nugget results in the transition zones of the different sandwich layers and not in the transition zone of the sandwich panel and the other sheet, depending on the material combination, material thicknesses and physical properties like heat conduction or thermal capacity of the materials.

Caused by the circumstance that sandwich structures are not weldable by resistance welding in initial state, what means in delivery condition, there exist a lot of elaborated processes to create a resistance-weldability for a certain extent. One example is the US patent application 2013273387, which relates to high-frequency welding of sandwich metal sheets. Accordingly, a first composite sheet metal part, comprising at least two metal sheets and a sheet arranged between both metal sheets that consists of a material with a different composition than the two metal sheets, is welded to a second sheet metal part consisting of a solid metallic material or a further composite material with at least two metal sheets and a sheet arranged between the metal sheets that consists of a material with a different composition than the two metal sheets.

A method how to weld sandwich panels with resistance spot welding is mentioned in the WO publication 2011082128A1, wherein the composite core material of a sandwich panel is layered by two metallic outer-layers. The target of creating specific resistance weldability is solved by having a plurality of steel fibers in the core-layer which arrange the electrical communication with the outer-layer steel sheets. One disadvantage is the reproducibility and repeatability of welding results. There is no guarantee to have the right and sufficient numbers of steel fibres in contact when a subsequent manufacturer wants to use the welding parameters. There is a big danger to create weld spatters in the contact areas of the steel-fibre with the steel outer-layers and to burn the non-metallic parts around it. Additional to the softening and displacing of the non-metallic interlayer, also and described in detail in the following publications, is mentioned as one way to solve the target.

To bypass the disadvantage of non-resistance-weldable sandwich structures, there are different patents which describe processes and methods how to make a sandwich structure in a specific further process weldable, which is in the initial, semi-finished product, delivery status configuration not weldable. One example is the JP publication 2006305591A where two metallic outer-layers overlapped on both surfaces with a thermoplastic resin insulating board. The target of bringing the two metallic layers into directly contact is solved by softening the resin insulating board and by pushing the board away outward the welding position. The both welding electrodes must be in a heated state which is cost extensive, needs special equipment for the manufacturers and is not established in the subsequent process industry.

Another specific way how to make a non-resistance weldable sandwich product in specific configuration weldable with an additional process step during component manufacturing is the DE publication 102011054362A1. The task is solved by heating the plastic core layer in a first process step and then to give a force with at least one electrode to the sandwich surface in a second process step. The non-metallic softened interlayer will be displaced from the force-loaded position and the both metallic outer-layers get into contact. Both steps are additional process steps during a component manufacturing, needs additional production time, increase manufacturing costs and drop the clock cycles. Further, it is mentioned that this solution only works for a specific border area of the component. The same additional process steps are worked out by the DE publication 102011109708A1, which describes also a subsequent process to make a sandwich structure weldable where the both metallic outer-layers are not in directly contact in the initial state. The FR publication 2709083A1 describes a typical sandwich panel with two metallic outer-layer sheets and a non-metallic core material which isolates the two outer-layers. To reach a specific weldability the same approach like in the DE publication 102011054362A1 is used: to soften and displace the non-metallic core material at the border area of the sheets.

Another extensive and complex way to create an electric circuit for a non-resistance weldable sandwich panel is described in the WO patent publication 2012150144A1. The task there is to build an electric bridge with additional machine parts to bypass the isolating polymer material and to reach a weldability of the sandwich with other sheets. A very extensive hardware which restricts the accessibility to the sheets needs additional time to install and to position at the right place. This increases the production costs. Especially for formed and big parts it will be problematical to create the electric contact with the problem of undefined current flow.

The WO patent publication 2014121940A1A describes a further way to join a sandwich. In this case the sandwich panel is defined as a structure with two metal faces and an insulating core material. That definition results in a non-weldability in the initial state of the sandwich. A joint, not with resistance welding, is only possible after a further production step to achieve a tongue portion at a first side face and a groove portion at an opposite second side face of the panel, wherein the tongue portion and the groove portion of adjoining panels engage each other on the assembly to form a joint between the adjoining panels.

Based on these publications, the disadvantage of sandwich structures with the non-given resistance-weldability in the initial, semi-finished product and delivery state is not solved. It is not possible for the subsequent, component manufacturing industry to use their existing, cost-efficient and fast resistance welding processes. The disadvantage can be derived by the non-continuous metallic material closure over the whole sandwich structure thickness.

SUMMARY OF THE INVENTION

The object of the present invention is to prevent the drawbacks of the prior art and to achieve an improved method for manufacturing a semi-finished sandwich panel wherein a continuous metallic material closure is ensured for subsequent resistance welding processes. In the resistance welding process the non-hardened and non-metallic material is repressed from the metallic contacts and the different metal layers are welded together as a so-called tack welding. The essential features of the present invention are enlisted in the appended claims.

In the method of the invention at least two metal layers wherein at least one metal layer is applied by using a three dimensional metal sheet, for example pointed out in the WO patent publication 2014096180A1, is combined with at least one non-metallic layer in a non-cured and non-hardened state between the metal layers. After the whole sandwich structure is built up, a resistance welding process is carried out in order to achieve a tack welding, which means that there is a complete metallic contact resulting in a continuous metallic material closure over the whole sandwich structure.

In accordance with the present invention a sandwich panel is manufactured from at least two metal layers and at least one non-metallic and non-hardened layer positioned in the recess spaces formed between two metal layers when at least one of the metal layers is shaped being a three dimensional object. The non-metallic and non-hardened layer is filled completely into the recess spaces formed between two metal layers. The usage of a heated device to ensure a good fluidity of the non-metallic material depends on the chemical basis. A preferably temperature for an epoxy resin is between 35 and 65° C., preferably between 40 and 65° C. to reach a viscosity over 500 mPas. The three dimensional metal layer can be optionally heated to at most 80° C., preferably also between 55 and 65° C. to increase the flow behaviour of the filled-in non-metallic material. For the following resistance welding process, preferably executed as a resistance roller seam process, to achieve the tack welding the electrode force is important to repress the non-hardened non-metallic material from the metallic contacts of the different metal layers but not to destroy the structure as well as the particular layer of the sandwich, such as distortion. Therefore, a preferably electrode force is 1.0 kN-3.0 kN, more preferably 1.8 kN-2.5 kN. Then the electrode force enables a metallic contact for the weld on the one side, but also persists a high filling degree of the non-metallic non-hardened layer on the other side with adhesion contacts to all metallic layers.

The advantage of the tack weld, utilized according to the invention, is that the non-metallic material is not damaged because of the high welding current or liquid metal during welding. Further, the tack weld enables subsequent forming operations, e.g. a deep-drawing process to create a formed component out of the flat sandwich sheet. A tack weld creates an advantageous stiffness of the sandwich like a normal weld. On the other side the tack weld enables a good handling stability during manufacturing of the sandwich structure before the adhesive is hardened. The joint of the layers, caused by the combination of the tack weld on the one side and the bond of the adhesive on the other side, enables a high form stability without a delamination of the different layers during different cutting or stamping technologies like laser cutting, water jet cutting, plasma cutting or mechanical cutting. The layer adhesion of the present invention is worked out favourable embodiment when the adhesion of the tack weld is lower than the adhesion of the non-metallic adhesive. As a result bending angles over 130 degrees without any delamination of the layers can be reached. Further, the resistance roller seam method is a cost-efficient manufacturing process which is further easy to automatable with a high welding speed more than 4 m/min.

In a subsequent manufacturing process, like car body engineering, it is possible, utilizing the tack welding in accordance with the present invention, to use a sandwich structure in initial, delivery state directly for a following resistance welding process, i. e. the sandwich structure is achieved to create a closure electrical circuit as well as to steer the resulting weld to the contact area of the sandwich structure with another metal component.

BRIEF DESCRIPTION OF THE DRAWINGS

The invention is explained in more details referring to the following drawing, where.

DESCRIPTION OF THE INVENTION

Figure 1:
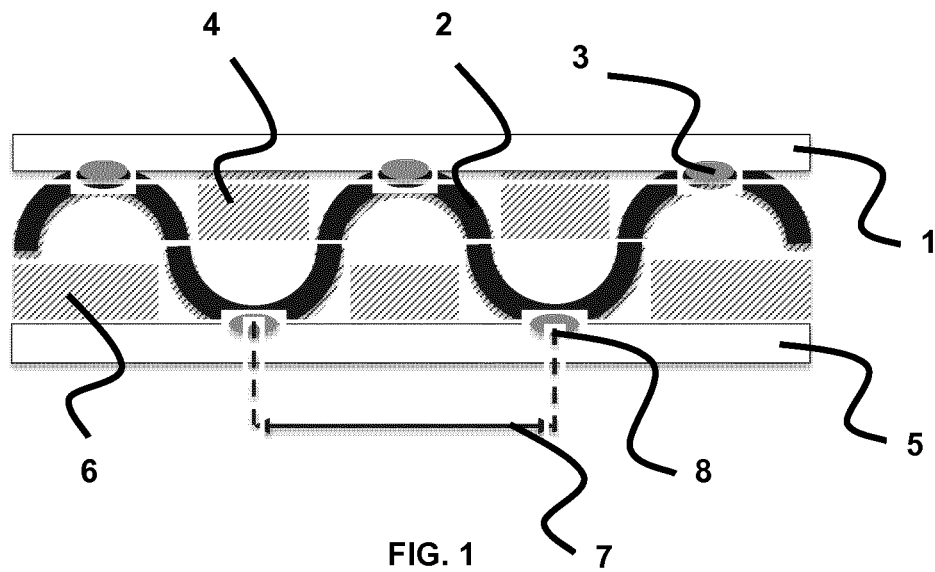
FIG. 1 shows a preferred embodiment schematically seen from the side view.

In FIG. 1 a metal layer 1 and a three dimensional metal layer 2 are tack welded 3 to each other. A recess space 4 between the metal layers 1 and 2 is filled with a polymer material. In FIG. 1 it is shown also a third metal layer 5. The metal layer 5 is tack welded 8 with the metal layer 2. Respectively, a recess space 6 between the metal layers 2 and 5 is filled with a polymer material. Further, FIG. 1 shows an example of the amplitude 7 between two tack welds 8.

Figure 2:
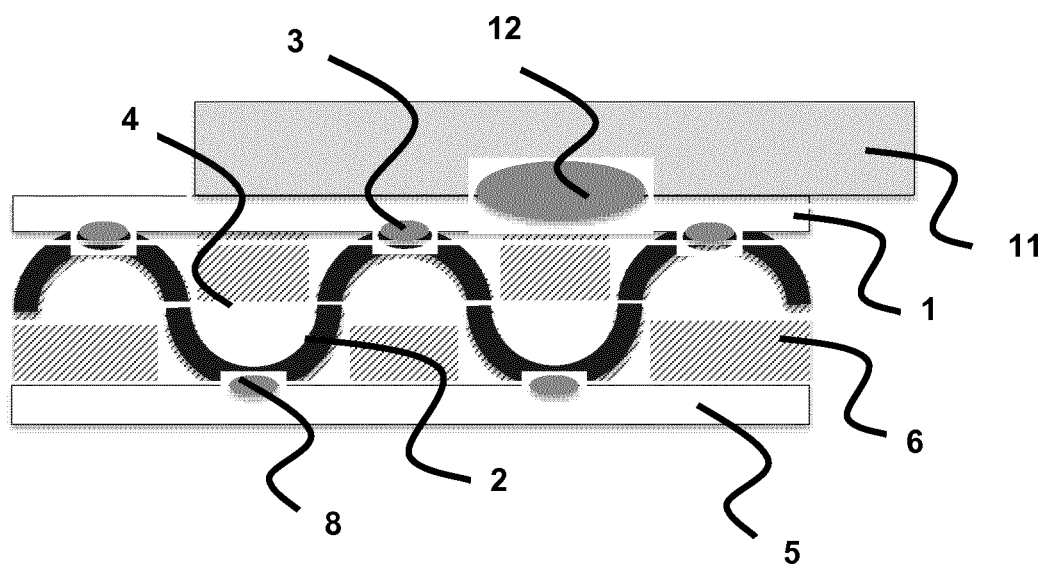
FIG. 2 shows the embodiment in FIG. 1 schematically seen from the side view when connected with another component.

FIG. 2 shows a solution for the sandwich structure of FIG. 1 where the sandwich structure is spot welded 11 with an external component 12.

In a preferable embodiment of the invention only a non-metallic adhesion layer is used for the non-metallic core as a contrast to most state of the art sandwich structures where a sandwich panel is build up with two metallic outer layers and with two layers of adhesion to bond both outer layers with the middle positioned core material. Therefore, the sandwich structure of the present invention can be created with a more simple manufacturing line and with increased clock frequency. The sandwich structure is cheaper because of saving two layers compared to the state of the art sandwich panels.

In the preferable embodiment of the present invention the recurring metal contacts have an amplitude lower than 5.0 mm, whereby a welding current for each amplitude of 1.0-1.4 kA is used to create the tack weld.

With the method of the present invention it is therefore possible to join the sandwich panel in order to connect the semi-finished product to a construction of a desired combination of solutions with other sheets, plates, formed parts or other sandwich panel components by resistance welding.

The form of the three dimensional layer, in combination with the chosen non-metallic material and the filling degree of the non-metallic material in the recess spaces formed between the metal layers, gives for these panels their mechanical, stiffness, sound, joining and process features.

The first and second metal layers in the manufacture of a sandwich panel according to the invention are advantageously made of the same material, such as stainless steel, carbon steel, copper, aluminium, magnesium, but the first and second metal layers can also be made of different metal materials, different metals or different metal compositions. However, when using different metals or different metal compositions the combination of these metals can further alter the behaviour of the sandwich panel. For instance, a combination of metals with different thermal expansion coefficients can be advantageous in some solutions of the present invention. By using two metals with two different thermal expansion coefficients can influence the thermal expansion of the sandwich panel, and the surface of the three-dimensional sheet will avoid disruption in the welded areas of the sandwich panel. Further, the sandwich panel of the present invention with two different metal layers can be used as a component bridge in wet-corrosion areas of multi-material designed car bodies. For instance, a foot of a b-pillar is manufactured with stainless steel and a rocker rail is manufactured with aluminium, the sandwich panel can be used as a connection between the two parts. The aluminium side of the sandwich is welded to the aluminium rocker rail and the stainless sandwich layer is welded with the stainless b-pillar. As a result there is no contact corrosion and no electrochemical potential bridge between the different components. The only potential bridge is then in the sandwich, but the non-metallic layer isolates big areas and the residual metallic contact are small (linear or point contact) in comparison to the component size.

The three dimensional metal layer in the manufactured sandwich panel of the invention is a corrugated metal piece, a metal piece in the shape of knobs, nubs on the surface of the second metal layer, or any other three dimensional metal piece which is mechanically connectable with the essentially flat two-dimensional first metal layer. Suitable shapes for the second metal layer are found for instance in the WO publication 2014/096180. The form of the second metal layer also determines damping, noise, vibration, stiffness, especially the buckling stiffness, and weldability of the sandwich panel. Nubs and knobs profiled sheets result in a direction independent stiffness but are only suitable weldable with resistance spot welding because of the punctual contact. Corrugated profiled sheets have a direction depending stiffness but enable welding with all continuous welding procedures like resistance roller seam welding because of the linear contact. In the case that the shape of the second metal layer is corrugated and dependent on the solution where the sandwich panel is utilized, the second metal layer can have a shape of an essentially sinusoidal wave, or the second layer can have a shape of a corrugated strip where the two parts of the strip next to each other are in the essentially perpendicular position to each other. Also other shapes of a corrugated strip can be used for the second layer in the sandwich panel manufactured according to the invention.

The non-metallic layer between the two metal layers in the sandwich panel of the invention is advantageously made of polymer material, resin material, sealant material, cold or thermosetting one or two component adhesive glues, for instance a crash-resistant one component adhesion glue used in the automotive industry or a two component sandwich-adhesion material containing resin and hardener. The essential properties of the non-metallic interlayer are non-cured and non-hardened condition during set-up of the sandwich and the viscosity during applying and the way of curing and foaming. A good viscosity to reach a defined filling degree without destroying the metallic contact areas is between 400 and 10000 mPas, more preferably greater than 500 mPas. Furthermore, a more advantageous embodiment of the non-metallic layer has viscoplastic or thixotropic properties and a specific weight of 1.0-1.1 $g/cm^3$. As pointed out before a preheating of the non-metallic material before applying can be suitable to reach the right applying viscosity, depending on the chosen polymer and preferred at the temperature range between 40 and 65° C.

The different metal layers in the sandwich panel of the invention are attached to each other by the combination of bonding to the adhesive and the metallic material closure resistance weld so that a subsequent resistance welding, in order to connect the semi-finished product to a construction of a desired combination of solutions, to other sheets, plates or formed parts will be focused on the points where the first metal layer and the second metal layer has a metallic material closure to each other. The distance A between the different material closure contacts inside the sandwich should be so small that in every case of the later position to other components, an electric circuit is enabled to build as a result the weld nugget between the other component and one of the outer layers of the sandwich structure. Regarding to the standard used copper electrodes for resistance spot welding according ISO 5821, a suitable distance for the invention is $\lambda \leq 5.5$ mm, preferably $\lambda \leq 2.5$ mm.

The sandwich structure of the present invention is used in a subsequent manufacturing process like car body engineering of passenger cars, commercial, agricultural or railway vehicles, especially in wet-area parts or parts like the car roof, cowl/front wall, channel, inlayer of a pillar, front lid or in noise relevant applications like container.

The invention claimed is:

1. A method for manufacturing a sandwich panel as a semi-finished product where a non-metallic material is positioned between at least two metal layers, the method comprising:
    providing the at least two metal layers, wherein at least one of the metal layers is shaped into a three dimensional layer and at least one of the metal layers is an essentially flat, two dimensional layer;
    bringing the at least two metal layers into contact with one another forming contact points and recesses between the at least two metal layers;
    filling the recesses with the non-metallic material; and
    tack welding the at least two metal layers to each other at the contact points between the at least two metal layers,
    wherein the tack welding provides areas for the semi-finished product to be resistance welded to a metallic component in a subsequent finishing process,
    during the filling of the recesses with the non-metallic material, the non-metallic material is kept from entering the contact points by the contact between the at least two metal layers, and
    an adhesion of the tack welding is lower than an adhesion of the non-metallic material.

2. The method according to claim 1, wherein the tack welding is worked out by a resistance roller seam weld with an electrode force of 1.0 kN-3.0 kN.

3. The method according to claim 1, wherein an amplitude of a distance between recurring metal contacts between the at least two metal layers is lower than 5.0 mm.

4. The method according to claim 1, wherein the tack welding between the at least two metal layers is achieved with a corrugated metal strip as the three dimensional layer.

5. The method according to claim 1, wherein that the tack welding between the at least two metal layers is achieved with the three dimensional layer being a metal piece in a shape of knobs and/or nubs on a surface of the three dimensional layer.

6. The method according to claim 1, wherein the at least two metal layers are made of the same metal material.

7. The method according to claim 1, wherein the at least two metal layers are made of different metal materials.

8. The method according to claim 7, wherein the at least two metal layers are made of different metal materials with two different thermal expansion coefficients influencing a thermal expansion of the sandwich panel.

9. The method according to claim 1, wherein the non-metallic material is a polymer material.

10. The method according to claim 1, wherein the non-metallic material is a resin material.

11. The method according to claim 1, wherein the non-metallic material is a sealant material.

12. The method according to claim 1, wherein the non-metallic material is a cold or thermosetting one or two component adhesive glue.

13. The method according to claim 1, wherein the non-metallic material is a two component sandwich adhesion material containing resin and hardener.

14. The method according to claim 1, wherein the semi-finished product is joined, in order to connect the semi-finished product to the metallic component, by welding in a subsequent manufacturing process.

15. The method according to claim 1, wherein the semi-finished product is joined, in order to connect the semi-finished product to the metallic component, by resistance spot welding in a subsequent manufacturing process.

16. The method according to claim 1, wherein a viscosity of the non-metallic material is 400-10,000 mPas.

17. The method according to claim 1, wherein the tack welding is a resistance welding process using a welding current of 1.0-1.4 kA.

18. The method according to claim 1, wherein each of the at least two metal layers comprises a metal selected from the group consisting of stainless steel, carbon steel, copper, aluminium, and magnesium.

19. The method according to claim 1, wherein the sandwich panel can be bent at an angle of over 130 degrees without any delamination of the at least two metal layers.

* * * * *